(Model.)
P. SCHNEIDER, H. TRENKAMP & N. FLAMMANG.
INJECTOR.
No. 351,287. Patented Oct. 19, 1886.
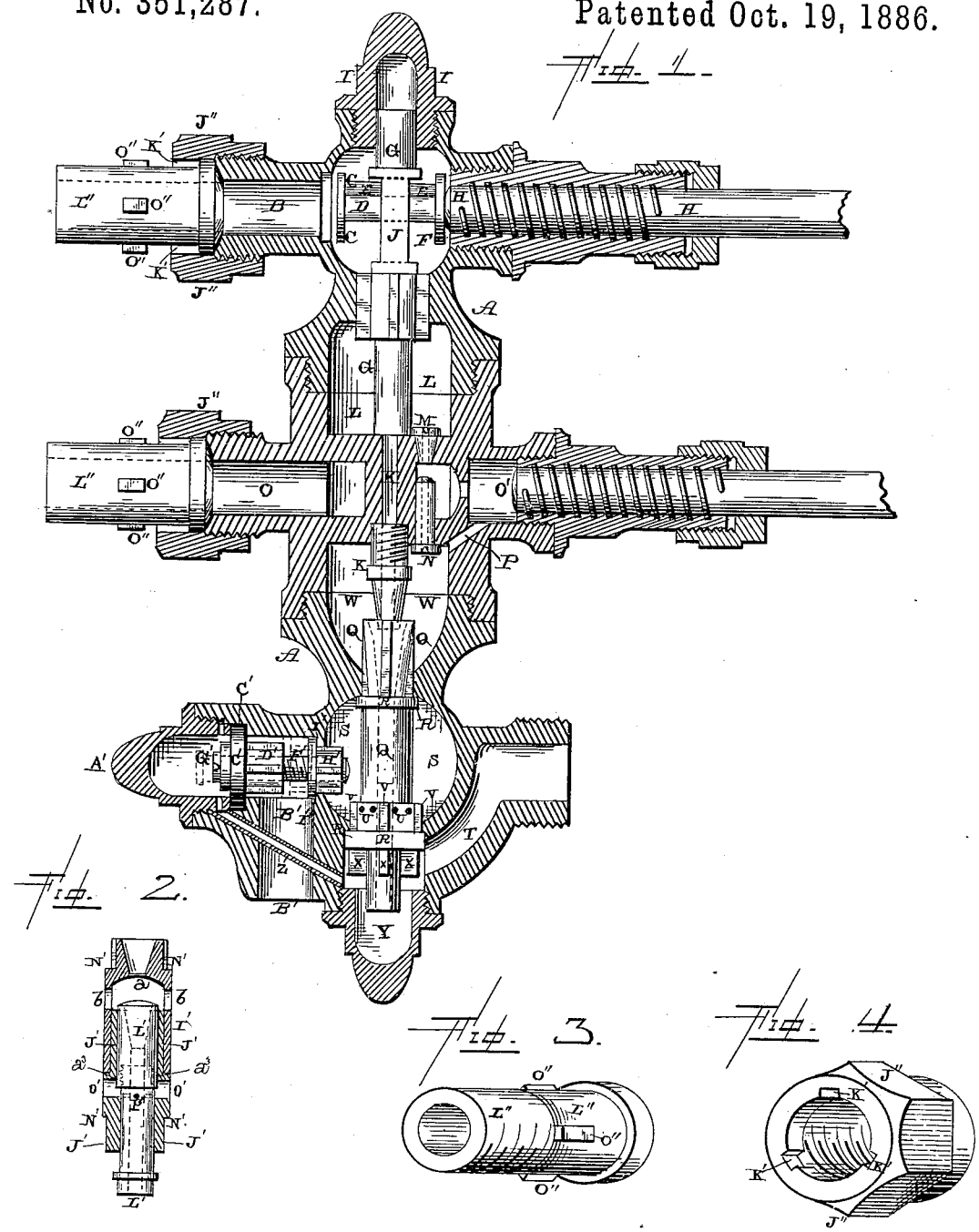

UNITED STATES PATENT OFFICE.

PAUL SCHNEIDER, HENRY TRENKAMP, AND NICOLAS FLAMMANG, OF CLEVELAND, OHIO.

INJECTOR.

SPECIFICATION forming part of Letters Patent No. 351,287, dated October 19, 1886.

Application filed April 7, 1886. Serial No. 198,117. (Model.)

*To all whom it may concern:*

Be it known that we, PAUL SCHNEIDER, HENRY TRENKAMP, and NICOLAS FLAMMANG, of Cleveland, in the county of Cuyahoga and State of Ohio, have invented certain new and useful Improvements in Injectors; and we do hereby declare the following to be a full, clear, and exact description of the invention, such as will enable others skilled in the art to which it pertains to make and use it, reference being had to the accompanying drawings, which form part of this specification.

Our invention relates to an improvement in injectors; and it consists in, first, the combination of the valve-stem to turn on and shut off the steam, having the valve, the cam, and the stop-plate all formed in one solid piece with the stem with the endwise-moving steam-actuated valve, which has a loop formed in its stem, and through which the stem of the valve passes, so that at the same time that the steam is turned on the valve is opened; second, the force-tube, which is made in two parts, perforated near its lower end and made to move automatically, and which is adjustable in length for the purpose of adjusting it to any variation in distance between the two disks or valves formed upon it; third, the combination of a double endwise-moving valve, a suitable guide through which the stem of the valves moves, with the chamber through which the force-tube passes, the passage for conducting water against the outer sides of the outer valve, so as to keep the two valves closed while the injector is in operation, and the overflow; fourth; the arrangement and combination of parts, which will be more fully described hereinafter.

Figure 1 is a vertical section of an injector embodying our invention. Figs. 2, 3, and 4 are detail views of the same.

A represents the shell of the injector, which is made in three parts, as shown, and which parts are connected together by screw-threads. The steam-inlet B is controlled by the valve C, which is formed upon the inner end of the stem D. Also formed as a part of this stem D is the cam E and the stop-plate F. The cam E serves to operate the valve G by passing through the loop which is made in the valve-stem, and lifting it from its seat at the same time that the stem is turned for the purpose of opening the valve and admitting steam. When the stem is turned so that the cam does not strike against the upper end of the loop in the stem of the valve G, its weight and the pressure of steam alone keep the valve closed. The stop-plate F on the stem D strikes against the inner end of the center piece, H, which is screwed into the shell A, and thus limits the distance that the valve shall be raised above its seat. This plate F is necessary, for the reason that if no stop were employed the valve might be drawn up through the loop in the stem of the valve G and the valve become turned, so that the valve and the loop would no longer come in line with each other, and thus require the center piece, H, to be removed for the purpose of adjusting them.

By forming the valve C, the cam E, and the stop-plate F all upon the same stem, the construction of the parts is greatly simplified and cheapened. The stem-valve G is introduced into the frame A through the opening which is closed by the screw-plug I. The loop J formed in the stem of this valve G is of such a length and shape that the valve is only lifted from its seat after the valve has been turned partially around, and then when the cam comes against the under side of the loop the valve G is lifted from its seat high enough to allow a free passage of steam through the force-tube K. Before the valve G is lifted from its seat at the upper end of the force-tube K, the steam passes into the chamber L and passes through the lift-tubes M N.

The water-passage O, the force-tube K, the two lift-tubes M N, the grading-valve O', and the passage P are the same as shown in the patent granted to us July 1, 1884, and which bears No. 301,395, and hence need not be more fully described in this connection. The action of these parts is the same in every respect. Also in this Patent No. 301,395 is shown a relief-valve, but which in this instance is entirely dispensed with, and in its place is substituted a counter-pressure relief-chamber, located within the force-lines of the perforated automatic endwise-moving adjustable water-force tube Q. This force-tube Q is made in two pieces, which may be screwed together or left loosely telescoped at the joint of their union, for the purpose of adjusting any variation in the distance between the two disks R, which are formed upon the tube. Each one of these disks or valves fits against a suitable valve-seat made for it—one in the chamber S and the other in the outlet T to the boiler. The variation between the two disks R will be caused by the expansion of the tube or the wear of the seats on the disks. Near the lower end, inside of this force-tube Q, is located the counter-pressure relief-chamber $a^3$, connecting with chambers S by a suitable number of perforations, U, which come just above the lower edge of the chamber S and in between the guiding-ribs V, which are formed upon the tube at this point. Between the ribs V and the opening through the bottom of the chamber S there is left just room enough, when the lower disk, R, is not forced upward against the seat, to allow a passage of water into the passage T. These perforations or slots U and chambers serve as a relief to the force of water which is being forced through the tube Q. The water escapes through these openings into the chamber S, which surrounds them, and which is located at a point within the force of the forcing-tube Q.

There is always a reacting water-pressure in a force-tube of any injector, just at the time that the boiler-check is opened, and for that instant the operation varies, and frequently stops, because the forcing capacity of the injector is taxed beyond its power, for the reason that as the steam-pressure rises the lifting-jets supply water faster than the forcing-jets can dispose of it, and thus the accumulation of lifted water in the chamber W is heated to such a degree as to prevent the forcing-jets keeping up the necessary vacuum required to resist this reaction within the water-force tube Q, and the injector must stop. The perforations and relief-chamber inside the forcing-tube Q, in connection with the chamber S, regulate this difficulty by relieving the over-pressure in the tube Q, and thus no water is allowed to accumulate in the chamber W beyond that required to supply the forcing-jets. Thus as the variations between the lift and the force occur, the relief-chamber and the perforations U immediately harmonize the difference.

Upon the lower end of the tube Q, below the lower disk or valve, R, are formed wings X, which not only serve to guide the movement of the tube Q, but serve the additional purpose of holding the tube Q in proper position for the next operation. These wings sink downward with the tube until they rest upon the upper edge of the plug-valve Y, which is made recessed, as shown, so as not to come in contact with the lower end of the tube, and thus interfere with its action. When the two valves or disks R on the tube Q are bearing against their seats, no water can pass from the chamber W into the one S.

In case it should be desired to make the force-tube Q in three parts, the construction shown in Fig. 4 will be used. In this case the tube consists of the upper part, I', the central portion, J', and the lower portion, L'. The two portions I' J' are provided with valve-seats N' upon their ends, and each one is provided with perforations through its sides. These two parts I' J' slide freely back and forth upon each other, so that each one will freely adjust itself to its own seat. The perforations $b$, made through the part I', are larger than those O' made through the part J'. The lower part, L', is placed inside of the part J', and when forced upward its upper end seats itself upon the interior end, $a$, of the part I', and its lower end seats itself against the lower end of the part J'. Through this lower part, L', are made small perforations P'. When this part L' is forced upward, these perforations move beyond the openings O' in the part J'; but when this part L' sinks downward these openings P' are about on a line with the openings through the part J'. This lower part, L', is made in two parts, so as to be adjustable for the purpose of taking up any wear of the parts, which would cause a wasting of the overflow.

A force-tube constructed as here shown makes an injector automatic in its operation—that is to say, if, when working, it should stop or break, it would restart of itself.

In this injector the lift is independent and separate from the force. This injector is automatic, and restarts and regulates its water-supply without the use of a throttle-valve in the suction-pipe. No matter what the steam-pressure may be, the suction is not checked, and there is not a drop of waste at the overflow under varying steam-pressure.

To operate the injector as automatic, the valve in the steam-pipe being always open, it is only necessary to throw the operating-lever wide open, which will admit the steam to the lift and force at the same time. The inside piece of this automatic force-tube drops down a considerable distance from the upper or top piece when not in use, and thus allows all of the steam to pass and discharge at the overflow until water comes and fills the injector, and then all of the steam is condensed and forms a vacuum between the forcing-jets. The parts of this automatic tube, by the aid of this vacuum and pressure of water underneath and passing through it, assume their respective positions when the injector is at work, and continue so until a stoppage. Then the force-water tube drops away, especially the inside piece, leaving ample space for free discharge of lift-steam, so that the injector may recover itself to continue or renew its operation without using levers, as is the case in positive injectors which have been heretofore used.

Leading from the outlet T to the boiler through which the feed-water passes is the inclined water-passage Z, which extends upward and connects at its upper end with a suitable recess and perforations made in the cap-nut A'. Passing vertically down through the casing, between the chamber S and the cap-nut A', is the overflow B'. Between this overflow B' and the cap A' is formed the flange C', and clamped between this flange C' and the cap-nut A' is a movable guide, D', through which the valve-stem F freely plays. On the outer end of this stem F' is placed a valve, G', and upon its inner end is placed a valve, H'. The stem is made threaded, so that the two valves can be adjusted in relation to each other. The water, while the injector is in operation, passes through the passage Z and bears against the outer side of the valve G', and thus forces the stem F' endwise, forcing the valve G' against the guide D' and the valve H' against its seat I'. No water can pass from the chamber S toward the overflow B', for the reason that the pressure in the passage Z against the valve G' is greater than the pressure in the chamber S and against the valve H'. When, however, the injector ceases to operate, the pressure is released from the outer side of the valve G', and then the pressure of the lift-water in the chamber S will cause the valve H' to move back from its seat, and thus open up communication with the overflow B'. The pressure of the water in the chamber S is from the lift only, while the pressure against the valve G' is from the water that is being forced, and hence the valve H' can only operate to open the overflow when the force of water is stopped. The first movement of the valve C is to let in sufficient steam to lift water, and which passes into the chamber L, and then through the lift-tubes M N, and thus causes water to be lifted through the passage O, which passes down through the tube N into the chamber W, and then around the upper end of the tube Q into the chamber S. The force-tube Q always drops downward from its own weight, and hence this lift-water will run into the chamber S, force open the valve H', and pass off through the overflow without being forced into the boiler. As soon as the steam is turned on in full and the water is being forced into the boiler, the pressure of the water against the lower disk, R, which is larger than the upper one, causes the tube Q to move upward toward the steam force-tube K, and thus closes both of the valves R against their seats. The pressure of the forced water then closes the valve H' by bearing against the one G', and the overflow is thus at once shut off and the machine is at work.

Each one of the union coupling-nuts J" has a number of slots, K', made through it, and passed upward through this nut is the pipe L", which is screw-threaded at its outer end, and which is provided with a number of projections, O", corresponding to the slots K' in the nuts. Each one of these pipes has an enlarged head on its inner end, which forms a ground or tight joint with the steam or water inlets B O. These projections or lugs O" enable the pipes L", in connection with nuts, to be turned by means of pipe tongs or wrenches, and thus connect the pipes L" to the other pipes.

Having thus described our invention, we claim—

1. The combination of the valve G, provided with a loop or opening in its stem, with the valve-stem H, having a valve formed in its inner end to control the passing of steam, and provided with a cam, the stem H being made to pass through the loop, substantially as shown.

2. The combination of the stem H, provided with a stop, F, the cam E, and the valve C, with the valve G, having a loop or opening, J, in its stem, substantially as described.

3. In an injector, the combination of the force-tube K with the endwise-moving force-tube Q, made in two parts, so as to be adjustable in length, and which is provided with the two valves R, substantially as set forth.

4. In an injector, the combination of the force-tube K with the force-tube Q, which passes through the chamber S, and is provided with perforations for the escape of the water from the tube into the body of injector for the purpose of relieving the pressure of water in the tube Q, substantially as specified.

5. In an injector, the combination of the water-passage O, the lift-tubes M N, the force-tubes K Q, chambers W S, overflow-water passage Z, and the two valves G' H', substantially as shown.

6. In an injector, the combination of the water-passage, lift-tubes, the stationary and endwise-moving force-tubes, the chambers W S, the waste-valve H', and the overflow, whereby a constant flow of water can be kept up through the injector without its being forced into the boiler, substantially as described.

7. In an injector, the combination of the stationary force-tube, the water-passage, the lift-tubes, the two chambers W S, the endwise-moving force-tube provided with the valves R, and the inside counter-pressure relief-chamber and perforations U, with the waste-valve and overflow, substantially as set forth.

8. In an injector, the combination of the water-passage, the stationary force-tube, the lift-tubes, and the chambers W S, with the endwise-moving force-tube provided with the two valves R, and the ribs X, and the screw-plug, upon which the ribs rest and support the tube, substantially as specified.

9. In an injector, a force-tube which is composed of two or more parts, the outer ones of which are adjustable one upon the other, and which are provided with valves, substantially as described.

10. The combination, with an injector, of nuts J'', provided with the slots K', the pipe L'', provided with the projections O'', the pipe having an enlarged head on its inner end, which forms a tight joint with one of the inlets, substantially as specified.

In testimony whereof we affix our signatures in presence of two witnesses.

PAUL SCHNEIDER.
HENRY TRENKAMP.
NICOLAS FLAMMANG.

Witnesses:
H. S. FORD,
E. A. ANGELL.